United States Patent
Tay et al.

(10) Patent No.: US 10,272,864 B1
(45) Date of Patent: Apr. 30, 2019

(54) CRUSHABLE DOOR ASSEMBLY

(71) Applicant: Ford Global Technologies, LLC, Dearborn, MI (US)

(72) Inventors: Yi Yang Tay, Warren, MI (US); John Pinkerton, Canton, MI (US); Aleksandar Spasovski, Canton, MI (US); Michael Dong, Novi, MI (US); Joseph Edward Abramczyk, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 30 days.

(21) Appl. No.: 15/793,294

(22) Filed: Oct. 25, 2017

(51) Int. Cl.
| | |
|---|---|
| *B60J 5/00* | (2006.01) |
| *B60R 21/04* | (2006.01) |
| *B60R 13/02* | (2006.01) |
| *B60R 21/00* | (2006.01) |

(52) U.S. Cl.
CPC ...... *B60R 21/0428* (2013.01); *B60R 13/0243* (2013.01); *B60R 2021/0006* (2013.01)

(58) Field of Classification Search
CPC ............ B60R 21/0428; B60R 13/0243; B60R 2021/0006
See application file for complete search history.

(56) References Cited

U.S. PATENT DOCUMENTS

| | | | |
|---|---|---|---|
| 6,568,743 B1 | 5/2003 | Jayasuriya et al. | |
| 7,503,621 B2 | 3/2009 | Mani | |
| 9,527,458 B2 | 12/2016 | Sperl et al. | |
| 2009/0284041 A1* | 11/2009 | Hall | ...... B60J 5/0451 296/146.6 |

FOREIGN PATENT DOCUMENTS

| | | |
|---|---|---|
| CN | 204340813 U | 5/2015 |
| JP | 2008087634 A | 4/2008 |
| JP | 5023677 B2 | 6/2012 |

* cited by examiner

*Primary Examiner* — Lori L Lyjak
(74) *Attorney, Agent, or Firm* — Frank A. MacKenzie; Bejin Bieneman PLC

(57) ABSTRACT

A door assembly includes a monolithic base including a top panel having a first end and a second end opposite the first end. The monolithic base includes an attachment panel extending downwardly from the first end at an acute angle. The monolithic base includes an outer panel extending downwardly from the second end.

20 Claims, 8 Drawing Sheets

CRUSHABLE DOOR ASSEMBLY

BACKGROUND

The Insurance Institute for Highway Safety (IIHS) has standardized a side impact crash test in which a stationary test vehicle is struck on the driver side by a crash cart fitted with a 1,500 kilogram moving deformable barrier (MBD). The MBD has an impact velocity of 50 km/h (31.1 mi/h) and strikes the vehicle on the driver side at a 90 degree angle. In a similar test, the National Highway Traffic Safety Administration (NHTSA) has developed a New Car Assessment Program (NCAP) side impact crash test in which the MBD has a mass of 1,361 kg and an impact velocity of 61.9 km/h.

A vehicle may include a door, and the door may include an armrest assembly. At least a portion of the armrest assembly may crush in response to a force, such as the IIHS side impact crash test, the NHTSA NCAP side impact crash test, etc.

DETAILED DESCRIPTION

Figure 1:
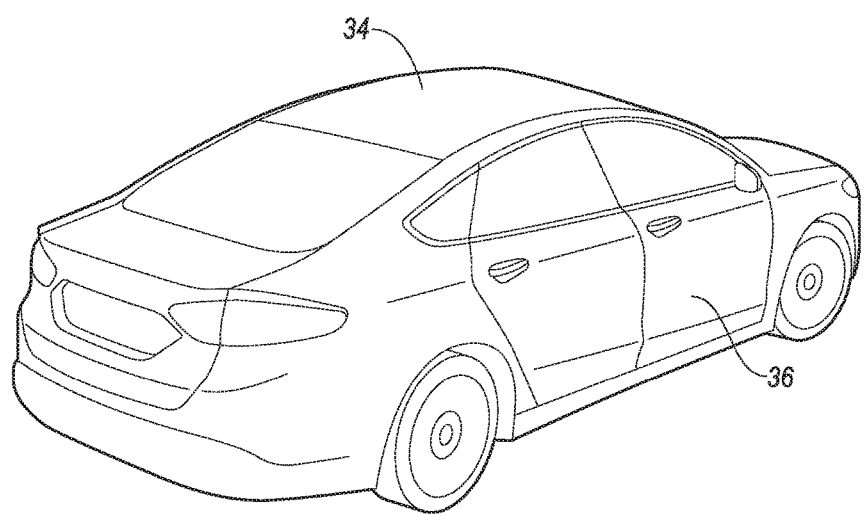
FIG. 1 is a perspective view of a vehicle.
Figure 2:
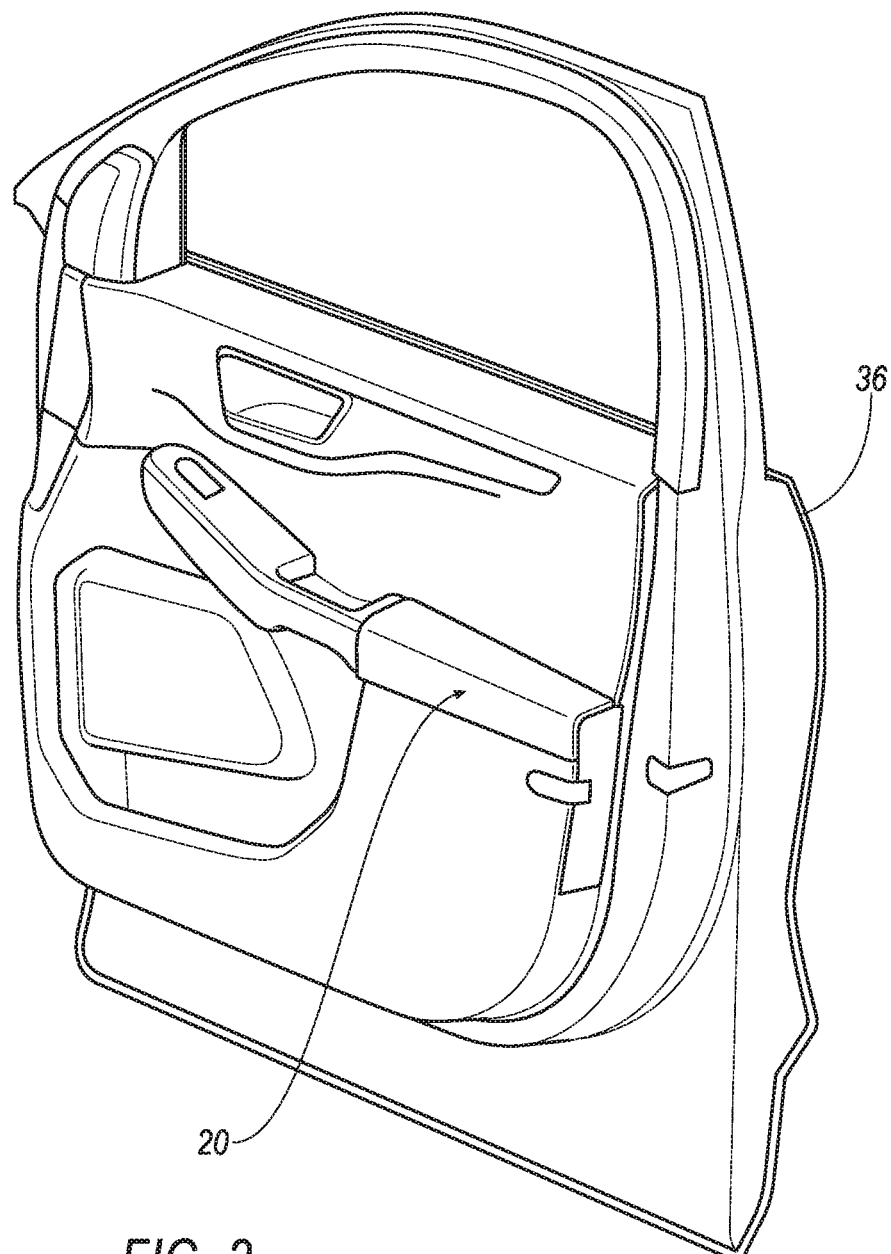
FIG. 2 is a perspective view of a door of the vehicle including a door assembly.

A door assembly includes a monolithic base including a top panel having a first end and a second end opposite the first end. The monolithic base includes an attachment panel extending downwardly from the first end at an acute angle. The monolithic base includes an outer panel extending downwardly from the second end.

The monolithic base may include a plurality of attachment panels, each attachment panel extending downwardly from the first end at the acute angle and spaced from each other.

The plurality of attachment panels may be spaced from each other by a threshold amount based on a standard armrest impact test.

The standard armrest impact test may be one of a 5th Pole test, an IIHS test, and a UNCAP test.

The monolithic base may include a heat stake extending from the attachment panel.

The heat stake may extend normally from the attachment panel.

The top panel may define an opening.

The opening may be defined by a first edge and a second edge spaced from the first edge and positioned below the first edge.

The door assembly may include a pad supported by the top panel.

The pad may include a first end proximate the first end of the top panel and having a first thickness, and a second end proximate the second end of the top panel and having a second thickness that is greater than the first thickness.

The top panel may be planar.

The monolithic base may be formed of plastic.

The door assembly may include a crushable member supported by the monolithic base, and a pad supported by the crushable member.

A vehicle includes a door assembly including a monolithic base including a top panel having a first end and a second end opposite the first end, an attachment panel extending downwardly from the first end, and an outer panel extending downwardly from the second end. The vehicle has a cross-vehicle axis. The top panel extends transversely relative to the cross-vehicle axis.

The top panel may be offset from the cross-vehicle axis by a threshold amount based on a standard armrest impact test.

The standard armrest impact test may be one of a 5th Pole test, an IIHS test, and a UNCAP test.

The top panel may be offset from the cross-vehicle axis by 10 to 20 degrees.

The monolithic base may include a plurality of attachment panels, each attachment panel extending downwardly from the first end and spaced from each other.

The top panel may be planar.

The vehicle may include a trim panel secured to the attachment panel.

With reference to the Figures, wherein like numerals indicate like parts throughout the several views, a door assembly 20 of a vehicle 34 is generally shown. The door assembly 20 includes a monolithic base 22 including a top panel 24 having a first end 26 and a second end 28 opposite the first end 26. The monolithic base 22 includes an attachment panel 30 extending downwardly from the first end 26 at an acute angle A1. The monolithic base 22 includes an outer panel 32 extending downwardly from the second end 28.

Having the attachment panel 30 extend downwardly from the top panel 24 at the acute angle A1 improves lateral crush characteristics of the vehicle 34 in tests such as the IIHS side impact crash test, the NHTSA NCAP side impact crash test, etc.

With reference to FIG. 1, the vehicle 34 may be any type of passenger or commercial automobile such as a car, a truck, a sport utility vehicle, a crossover vehicle, a van, a minivan, a taxi, a bus, etc.

Figure 3:
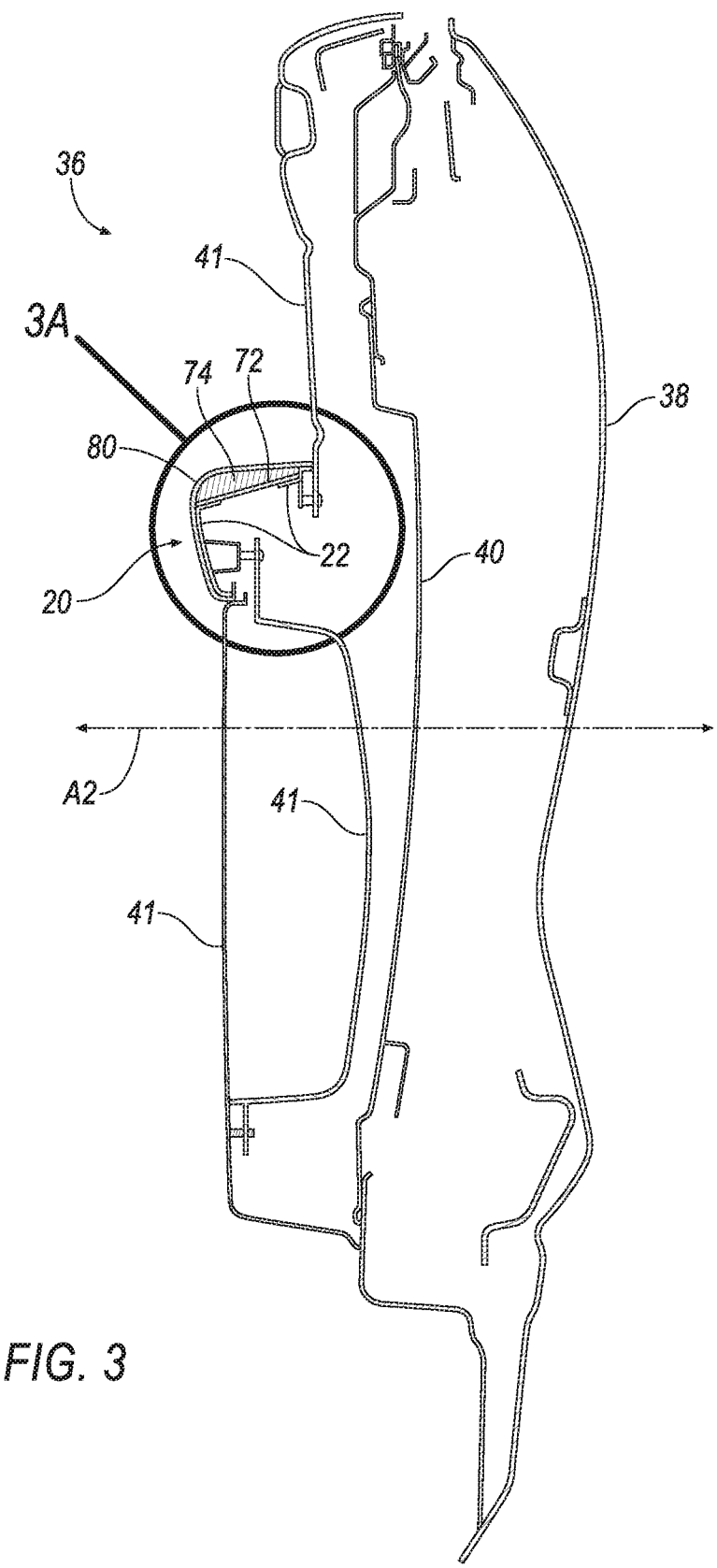
FIG. 3 is a cross-section of the door of FIG. 2.

The vehicle 34 may have a cross-vehicle axis A2, shown in FIG. 3. For example, the cross-vehicle axis A2 may extend between a driver side of the vehicle 34 and a passenger side of the vehicle 34. The cross-vehicle axis A2 may extend perpendicular to a forward traveling direction of the vehicle 34.

The vehicle 34 includes a door 36. While the door 36 is shown as a passenger side door in FIG. 1, the door 36 may be any suitable door, such as a driver side door, a rear door, etc. The door 36 includes a door outer panel 38, a door inner panel 40, one or more trim panels 41 and the door assembly 20. The door outer panel 38 may be fixed to the door inner panel 40 by flanging, welding, or in any other suitable fashion.

The door outer panel 38 and the door inner panel 40 may be formed of metal (e.g., aluminum, steel, etc.), composite material e.g., fiber reinforced thermoplastic, sheet molding compound (SMC), etc., or any suitable material. The door outer panel 38 may have a class-A surface facing exteriorly, i.e., a surface specifically manufactured to have a high-quality, finished aesthetic appearance free of blemishes.

The one or more trim panels 41 may provide a class-A surface facing a passenger cabin of the vehicle 34. The one or more trim panels 41 may be formed of plastic and may include a covering, as described for the door assembly 20. The trim panels 41 may be secured to the inner panel 40 and/or to each other, e.g., with fasteners, heat stakes, etc. The trim panels 41 may include one or more holes 42.

The base 22, shown in FIG. 3 through 6, includes the top panel 24, one or more attachment panels 30, and the outer panel 32. The base 22 is monolithic, i.e., a single piece of material with no seams, joints, fasteners, welds, or adhesives holding it together. For example, the top panel 24, the one or more attachment panels 30, and the outer panel 32 may be formed simultaneously by injection molding, blow molding, casting, etc. The base 22 may be formed of plastic, Acrylonitrile Butadiene Styrene (ABS), Polyphenylene Ether (PPE), or any suitable material.

The top panel 24 includes the first end 26. The top panel 24 includes the second end 28. The second end 28 is opposite the first end 26, for example the first end 26 may be spaced from the second end 28 along a lateral axis A3. The top panel 24 may be elongated along a longitudinal axis A4. The longitudinal axis A4 may be perpendicular to the lateral axis A3. The top panel 24 may be planar, e.g., relative to the lateral axis A3 and the longitudinal axis A4. The top panel 24 may include a top surface 44 and a bottom surface 46 opposite the top surface 44.

The top panel 24 may extend transversely relative to the cross-vehicle axis A2, e.g. when the door assembly 20 is installed in the vehicle 34. To put it another way, the lateral axis A3 of the top panel 24 has an orientation that is different, e.g., offset from, an orientation of the cross-vehicle axis A2, i.e., the lateral axis A3 of the top panel 24 is not parallel to the cross-vehicle axis A2.

Extending transversely relative to the cross-vehicle axis A2 limits a crush resistance of the top panel 24, e.g., makes the top panel 24 easier to crush along the cross-vehicle axis A2. To put it another way, force applied to the top panel 24 along the cross-vehicle axis A2 creates torque and compression stress in the top panel 24, thereby permitting the top panel 24 to crush easier than if the force only created compression stress.

The top panel 24, e.g., the lateral axis A3 of the top panel 24, is offset from the cross-vehicle axis A2 to define an angle A5 therebetween. For example, the angle A5 between the top panel 24 and the cross-vehicle axis A2 is 10 to 20 degrees.

The angle A5 between the top panel 24 and the cross-vehicle axis A2 may be a threshold amount based on a standard armrest impact test. The standard armrest impact test may be one of a 5$^{th}$ Pole test, an IIHS test, and a UNCAP test.

For example, when one of the 5$^{th}$ Pole test, the IIHS test, and the UNCAP test indicate that the door assembly 20 is too rigid, e.g., an amount of force required to deform the door assembly 20 is too high, the angle A5 between the top panel 24 and the cross-vehicle axis A2 may be increased.

The top panel 24 may define an opening 48. The opening 48 may be between the first end 26 and the second end 28 of the top panel 24. The opening 48 may be defined by a first edge 50 and a second edge 52 of the top panel 24. The first edge 50 may be spaced from the second edge 52, e.g., along the lateral axis A3 and with the opening 48 located therebetween. The first edge 50 may be proximate the first end 26, i.e., closer to the first end 26 than the second end 28. The second edge 52 may be proximate the second end 28. The second edge 52 may be positioned below the first edge 50.

Figure 3A:
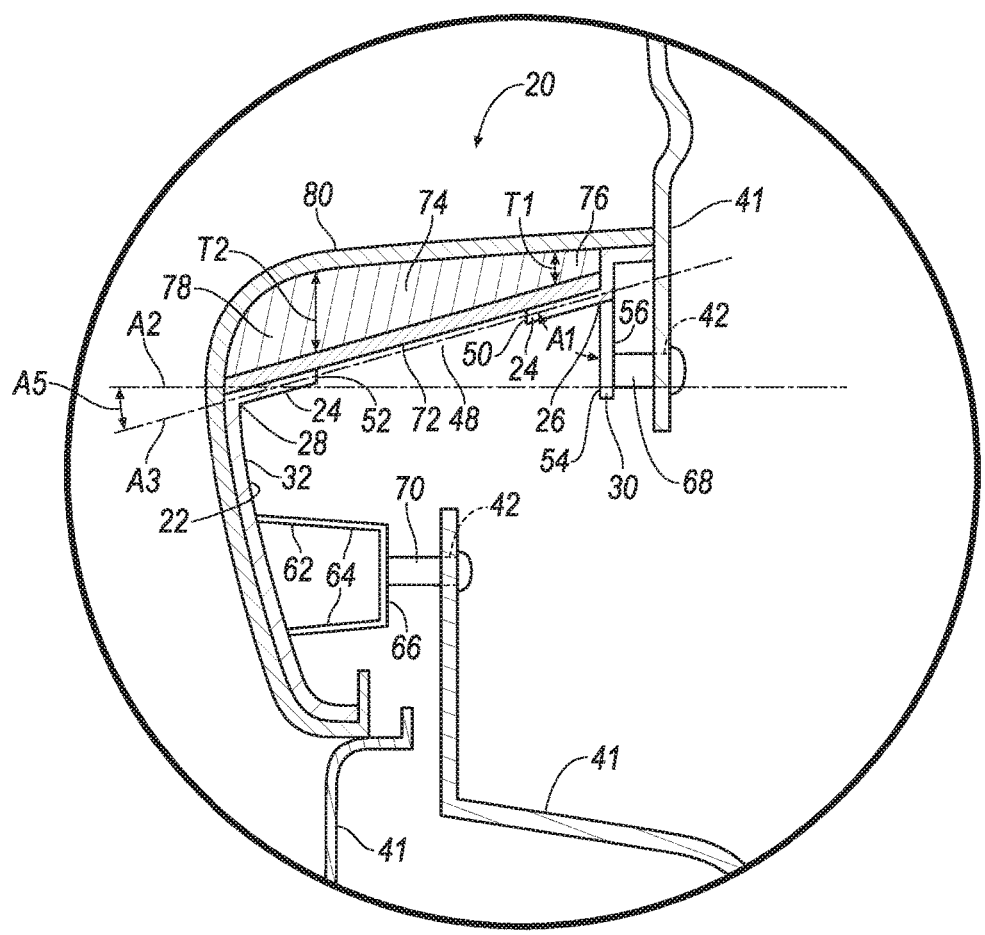
FIG. 3A is a close-up of a portion of the cross-section of the door.
Figure 3B:
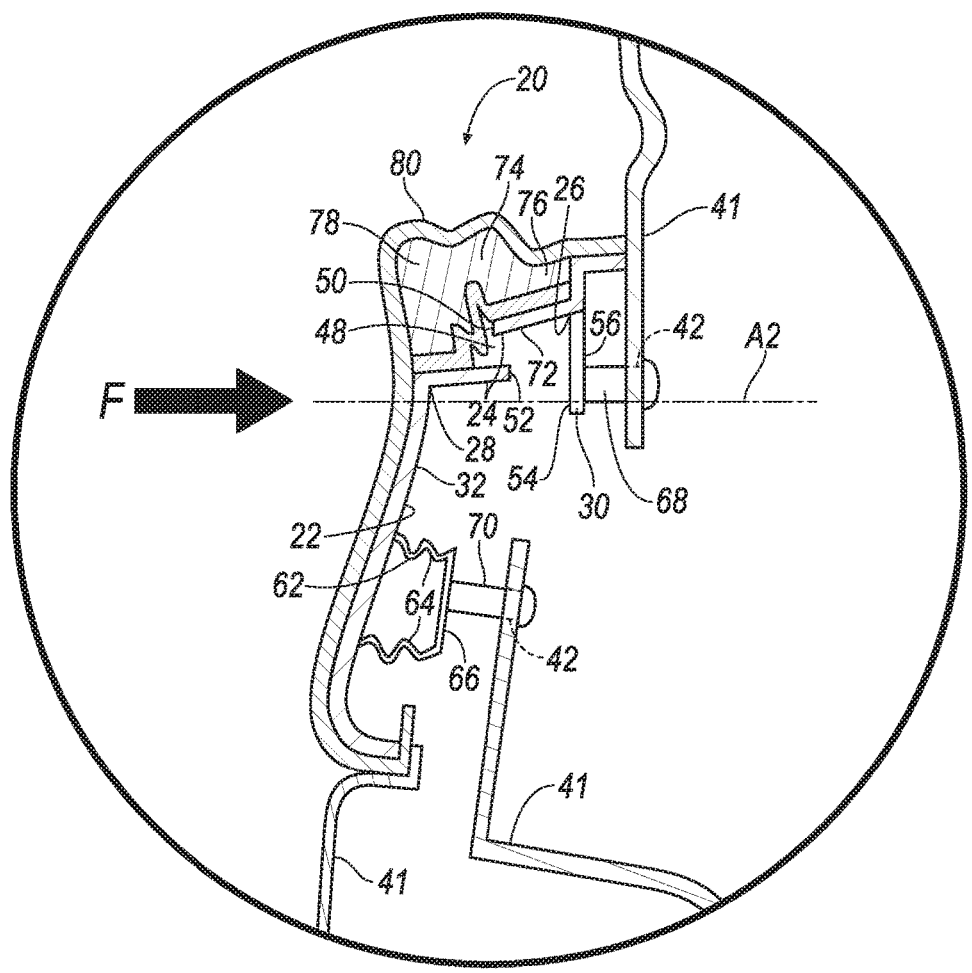
FIG. 3B is a close of the portion of FIG. 3A with an applied force.
Figure 4:
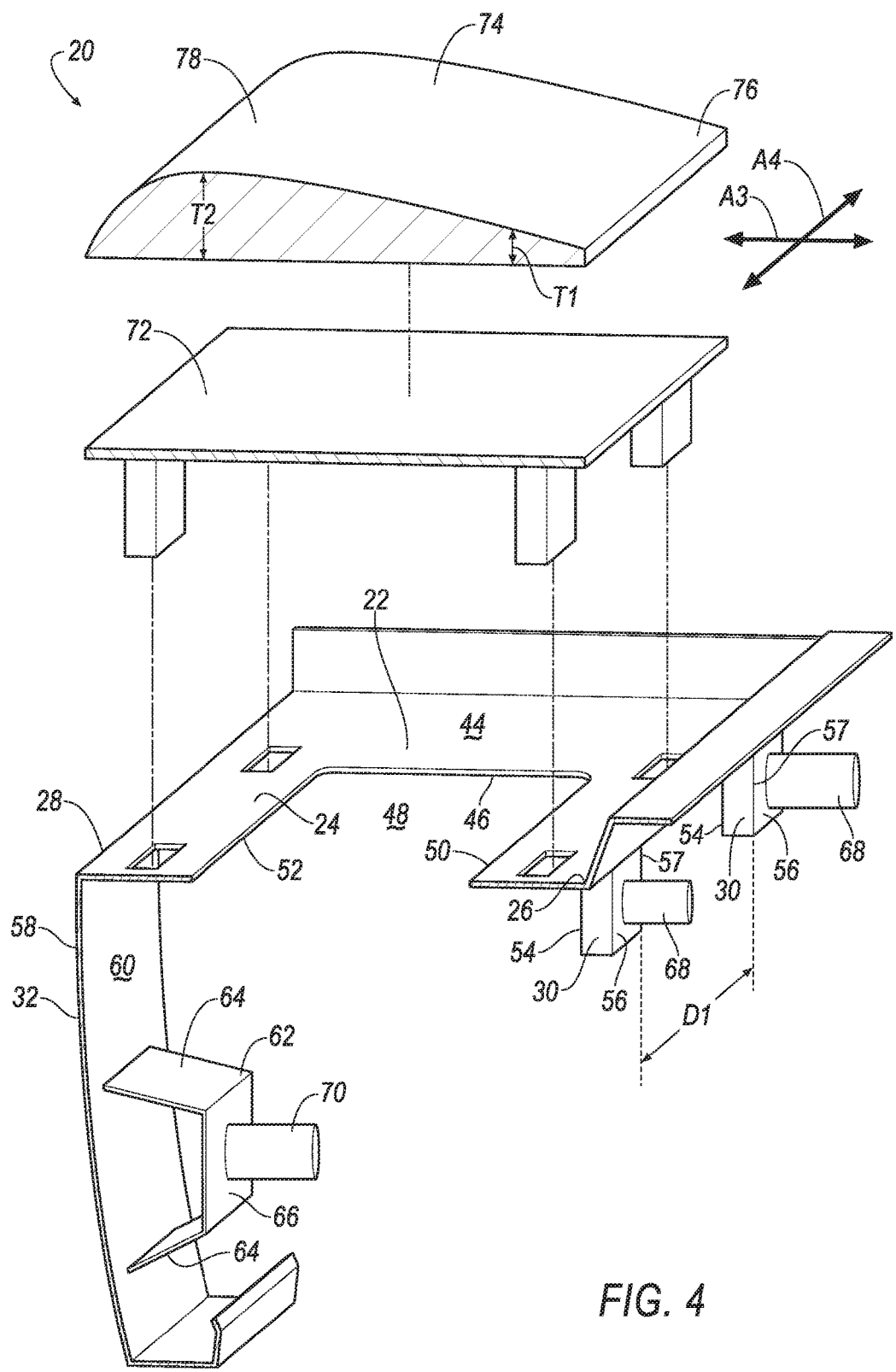
FIG. 4 is an exploded view of the door assembly.
Figure 5:
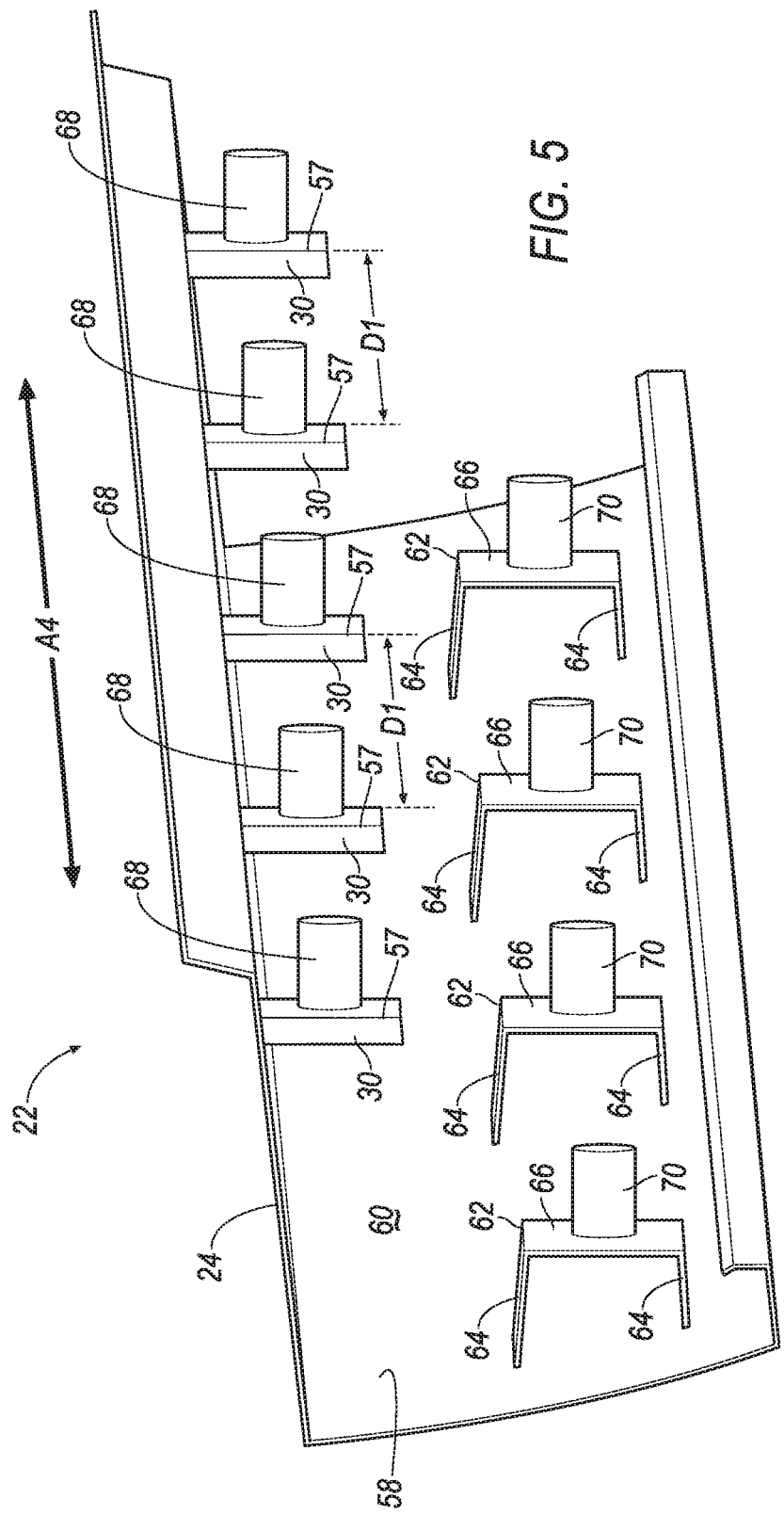
FIG. 5 is a perspective view of the door assembly.
Figure 6:
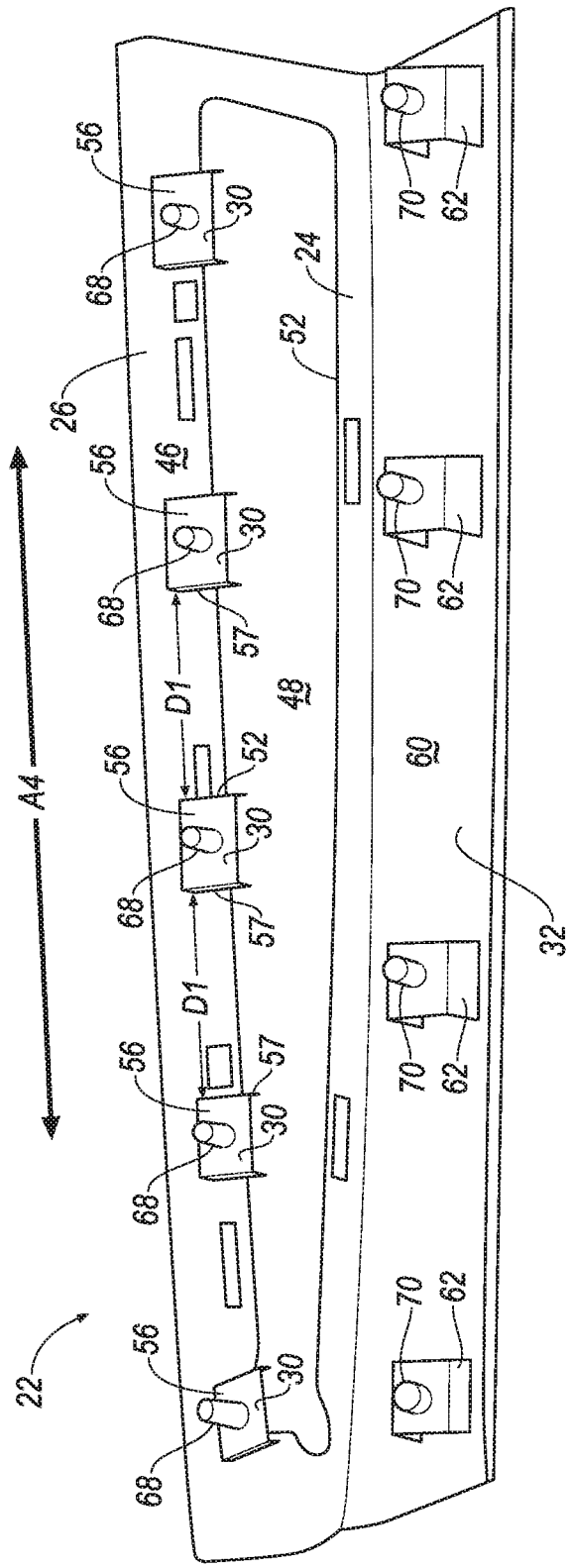
FIG. 6 is a perspective view of the door assembly.

Positioning the second edge 52 below the first edge 50 limits the crush resistance of the top panel 24. For example, when the top panel 24 crushes along the cross-vehicle axis A2, e.g., upon application of a force F generated by an occupant colliding with the door assembly 20 during a vehicle side impact, the second edge 52 may collapse under the first edge 50, e.g., without such edges 50, 52 contacting each other, as shown in FIG. 3B. Collapse of the second edge 52 under the first edge 50 permits the top panel 24 to crush easier than if the edges 50, 52 were aligned with each other along the cross-vehicle axis A2, as such alignment would cause the edges 50, 52 to abut each other and increase the crush resistance.

The base 22 includes the one or more attachment panels 30. Each attachment panel 30 may include an inner surface 54 and an outer surface 56 opposite the inner surface 54. Each of the one or more attachment panels 30 extend downwardly from the first end 26 at the acute angle A1. The acute angle A1 limits the crush resistance of the top panel 24, as described for the top panel 24 extending transversely relative to the cross-vehicle axis A2. For example, the acute angle A1 may be within a range of 70 to 80 degrees. For example, the acute angle A1 may be a threshold amount based on a standard armrest impact test, as described for the angle A5 between the top panel 24 and the cross-vehicle axis A2.

The attachment panels 30 may be spaced from each other. For example, the attachment panels 30 may be spaced from each other along the longitudinal axis A4. The attachment panels 30 may be spaced from each other by a threshold amount D1 based on a standard armrest impact test, e.g., the 5$^{th}$ Pole test, the IIHS test, the UNCAP test, etc. The threshold amount D1 may be between edges 57 of the attachment panels 30.

For example, when one of the 5$^{th}$ Pole test, the IIHS test, and the UNCAP test indicate that the door assembly 20 is too rigid, e.g., an amount of force required to deform the door assembly 20 is too high, the threshold amount D1 of space between the attachment panels 30 may be increased.

The base 22 may include the outer panel 32. The outer panel 32 may extend downwardly from the second end 28 of the top panel 24. For example, the outer panel 32 may extend downwardly relative to the cross-vehicle axis A2. The outer panel 32 may extend from the top panel 24 at an acute angle. The outer panel 32 may extend from the top panel 24 at an obtuse angle. The outer panel 32 may include an outer surface 58 and an inner surface 60 opposite the outer surface 58.

The base 22 may include a doghouse structure 62. The doghouse structure 62 may include a pair of support panels 64. The support panels 64 may extend from the inner surface 60 of the outer panel 32. The doghouse structure 62 may include a connection panel 66 connecting the pair of support panels 64 to each other. The connection panel 66 may be spaced from the outer panel 32.

The base 22 may include one or more heat stakes 68, 70. For example, one heat stake 68 may extend from each of the attachment panels 30. Such heat stakes 68 may extend from the outer surfaces 56 of the of the attachment panels 30. Such heat stakes 68 make extend normally from the attachment panels 30, e.g., from the outer surfaces 56 of the attachment panels 30. For example, one heat stake 70 may extend from each doghouse structure 62. Such heat stake 70 may extend normally from the connection panel 66 and away from the attachment panels 30.

The base 22 may be supported by one or more trim panels 41 and/or the inner panel 40. For example, the trim panel 41 may be secured to one or more of the attachment panels 30, e.g., via the heat stakes 68. For example, heat stakes 68, 70 may be disposed within the holes 42. Additionally or alternately, the base 22 may be secured to the trim panels 41 and/or the inner panel 40 with clips, threaded fasteners, etc.

The door assembly 20 may include a crushable member 72. The crushable member 72 is designed to plasticly deform, e.g., to absorb energy upon application of force to the door assembly 20, such as during a side impact collision. The crushable member 72 may be supported by the base 22. For example, the crushable member 72 may be supported by the top panel 24. The crushable member 72 may be secured to the base 22, e.g., to the top surface 44 of the top panel 24, e.g., with adhesive, one or more fasteners, etc.

The door assembly 20 may include a pad 74. The pad 74 may be formed of foam, rubber, etc., or any suitable material. The pad 74 may include a first end 76 and a second end 78 opposite of the first end 26. The first end 76 may be spaced from the second end 78 along the longitudinal axis A4. The first end 76 may have a first thickness T1. The second end 78 may have a second thickness T2 that is greater than the first thickness T1. For example, a cross section of the pad 74 may be wedge shaped, as shown in FIG. 3A. The pad 74 may be elongated along the lateral axis A3.

The pad 74 may be supported by the base 22. The pad 74 may be supported by the crushable member 72. The pad 74 may be secured to the crushable member 72, e.g., via sewing, adhesive, friction, etc. The first end 76 of the pad 74 may be proximate the first end 26 of the top panel 24, i.e., the first end 76 of the pad 74 may be closer to the first end 26 of the top panel 24 than to the second end 28 of the top panel 24. The second end 78 of the pad 74 may be proximate the second end 28 of the top panel 24.

The door assembly 20 may include a covering 80. The covering 80 provides a class-A exterior surface to the door assembly 20. The covering 80 may be formed of plastic, foam, leather, vinyl, etc. or any suitable material. The covering 80 may be fixed to one or more of the base 22, the crushable member 72, the pad 74, etc., e.g., via sewing, adhesive, friction, fasteners, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A door assembly comprising:
   a monolithic base including a top panel having a first end and a second end opposite the first end;
   the monolithic base including an attachment panel extending downwardly from the first end at an acute angle; and
   the monolithic base including an outer panel extending downwardly from the second end.

2. The door assembly of claim 1, wherein the monolithic base includes a plurality of attachment panels, each attachment panel extending downwardly from the first end at the acute angle and spaced from each other.

3. The door assembly of claim 2, wherein the plurality of attachment panels are spaced from each other by a threshold amount based on a standard armrest impact test.

4. The door assembly of claim 3, wherein the standard armrest impact test is one of a $5^{th}$ Pole test, an IIHS test, and a UNCAP test.

5. The door assembly of claim 1, wherein the monolithic base includes a heat stake extending from the attachment panel.

6. The door assembly of claim 5, wherein the heat stake extends normally from the attachment panel.

7. The door assembly of claim 1, wherein the top panel defines an opening.

8. The door assembly of claim 7, wherein the opening is defined by a first edge and a second edge spaced from the first edge and positioned below the first edge.

9. The door assembly of claim 1, further comprising a pad supported by the top panel.

10. The door assembly of claim 9, wherein the pad includes a first end proximate the first end of the top panel and having a first thickness, and a second end proximate the second end of the top panel and having a second thickness that is greater than the first thickness.

11. The door assembly of claim 1, wherein the top panel is planar.

12. The door assembly of claim 1, wherein the monolithic base is formed of plastic.

13. The door assembly of claim 1, further comprising a crushable member supported by the monolithic base, and a pad supported by the crushable member.

14. A vehicle comprising:
    a door assembly including a monolithic base including a top panel having a first end and a second end opposite the first end, an attachment panel extending downwardly from the first end, and an outer panel extending downwardly from the second end;
    the vehicle having a cross-vehicle axis; and
    the top panel extending transversely relative to the cross-vehicle axis.

15. The vehicle of claim 14, wherein the top panel is offset from the cross-vehicle axis by a threshold amount based on a standard armrest impact test.

16. The vehicle of claim 15, wherein the standard armrest impact test is one of a $5^{th}$ Pole test, an IIHS test, and a UNCAP test.

17. The vehicle of claim 14, wherein the top panel is offset from the cross-vehicle axis by 10 to 20 degrees.

18. The vehicle of claim 14, wherein the monolithic base includes a plurality of attachment panels, each attachment panel extending downwardly from the first end and spaced from each other.

19. The vehicle of claim 14, wherein the top panel is planar.

20. The vehicle of claim 14, further comprising a trim panel secured to the attachment panel.

* * * * *